(No Model.)

P. KAUFMAN.
CORN HUSKING IMPLEMENT.

No. 382,706. Patented May 15, 1888.

Witnesses
F. H. Schott.
H. A. Daniels.

Inventor,
Peter Kaufman.
By his Attorneys
Slade & Ruff.

UNITED STATES PATENT OFFICE.

PETER KAUFMAN, OF BLOOMINGTON, ILLINOIS.

CORN-HUSKING IMPLEMENT.

SPECIFICATION forming part of Letters Patent No. 382,706, dated May 15, 1888.

Application filed October 26, 1887. Serial No. 253,462. (No model.)

*To all whom it may concern:*

Be it known that I, PETER KAUFMAN, of Bloomington, in the county of McLean, and in the State of Illinois, have invented certain new and useful Improvements in Corn-Husking Implements; and I do hereby declare that the following is a full, clear, and exact description thereof, reference being had to the accompanying drawings, and to the letters of reference marked thereon, making a part of this specification.

My invention relates to an improvement in corn-husking implements, the object of the same being to provide an improvement on the implement patented to Peter Kaufman and Benjamin Kaufman, February 15, 1881, No. 237,877. In use the implement patented has been found defective in that no means have been provided to prevent the same from having contact with the knuckles of the fingers. A shield, C, as shown in said patent, was interposed between the husker and the hand to protect the latter; but in practice this has proved ineffective and the fingers are liable to bruises when the implement is steadily used.

In order to overcome the disadvantages referred to, the following improvement has been made on said invention, which consists in providing an angular extension on the shank of the husker, whereby the same may be so grasped as to keep the implement entirely free of the knuckles, thereby avoiding the necessity of the shield.

Figure 1:
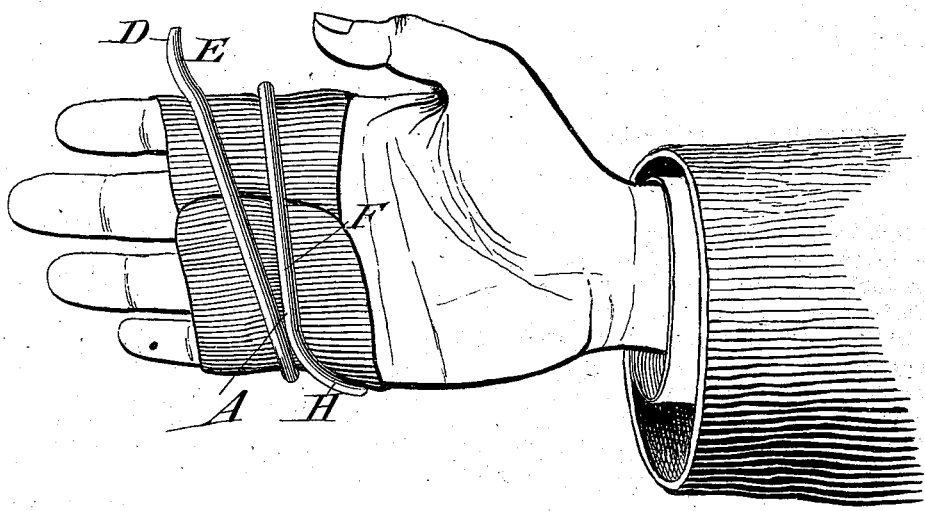
Figure 2:
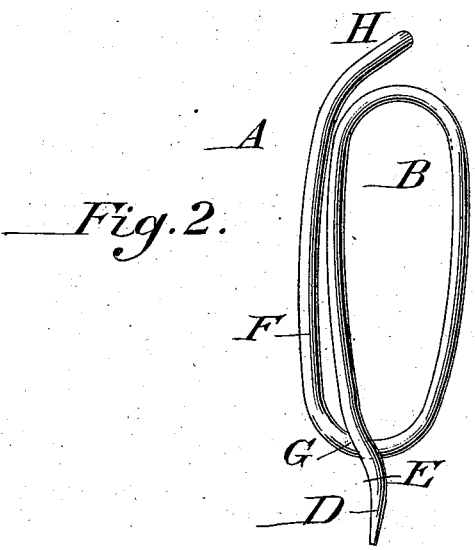
Figure 3:
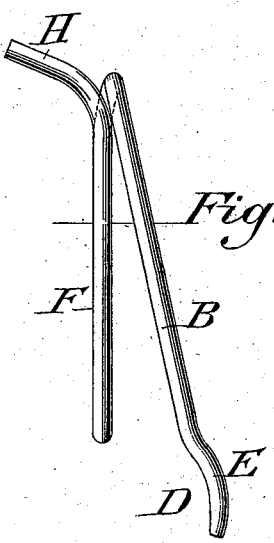

In the accompanying drawings, Figure 1 is a view of my invention on the hand and the shield attached thereto. Fig. 2 is a view in perspective, and Fig. 3 is a front view thereof.

A represents the implement, formed from a single piece of wire or other suitable material, bent to form a loop, B, with a projecting angular portion, D, forming the husking-point, which is curved or bent at E to conform to the shape of the thumb. The end F of the wire joins and crosses the loop, as at G, and is provided with the curved shank H, adapted to rest against the fleshy portion of the palm. The loop B is made large enough to pass over all the fingers of the hand and be grasped by said fingers between the second and knuckle joints thereof, with the portion D projecting over the forefinger, so that said portion will be clasped between the forefinger and thumb, and the shank H rests against the palm, as shown, whereby the implement is kept free of the knuckles when in use.

By having the shank H added to the device it will be seen that a positive and controlling grip can be had on the same and all possible abrasion of the knuckles thereby avoided.

If desired, the implement can be used in connection with a glove or shield without impairing its efficiency.

Having fully described my invention, what I claim as new, and desire to secure by Letters Patent, is—

The herein-described corn-husking implement, constructed from a single piece of wire or other suitable material, bent to form the loop B, for the reception of the fingers, the angular portion D, projecting over and beyond the forefinger, and the shank H, to bear against the side palm of the hand, substantially as and for the purpose set forth.

In testimony that I claim the foregoing I have hereunto set my hand this 18th day of October, 1887.

PETER KAUFMAN.

Witnesses:
THOS. SLADE,
L. H. ALDRICH.